(12) United States Patent
Kuehnle et al.

(10) Patent No.: US 10,545,227 B2
(45) Date of Patent: Jan. 28, 2020

(54) CHIRP SEQUENCE RADAR UNDERSAMPLED MULTIPLE TIMES

(71) Applicant: Robert Bosch GmbH, Stuttgart (DE)

(72) Inventors: Goetz Kuehnle, Ludwigsburg (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 15/867,033

(22) Filed: Jan. 10, 2018

(65) Prior Publication Data
US 2018/0203105 A1    Jul. 19, 2018

(30) Foreign Application Priority Data

Jan. 18, 2017  (DE) .......................... 10 2017 200 706

(51) Int. Cl.
| | | |
|---|---|---|
| G01S 13/02 | (2006.01) | |
| G01S 7/35 | (2006.01) | |
| G01S 13/34 | (2006.01) | |
| G01S 13/536 | (2006.01) | |
| G01S 13/58 | (2006.01) | |
| G01S 13/93 | (2006.01) | |

(52) U.S. Cl.
CPC ............ G01S 13/0209 (2013.01); G01S 7/35 (2013.01); G01S 13/34 (2013.01); G01S 13/536 (2013.01); G01S 13/584 (2013.01); G01S 13/931 (2013.01)

(58) Field of Classification Search
CPC .......... G01S 13/12; G01S 13/22; G01S 13/34; G01S 13/343; G01S 13/347; G01S 13/931
See application file for complete search history.

(56) References Cited

U.S. PATENT DOCUMENTS 3,878,525 A * 4/1975 Alpers .................. G01S 13/343
                                                                342/109
5,309,160 A * 5/1994 Powell .................... G01S 13/70
                                                                342/128
(Continued)

FOREIGN PATENT DOCUMENTS

| DE | 102014212280 A1 * | 12/2015 | ............. G01S 13/34 |
|---|---|---|---|
| WO | 2014/075838 A1 | 5/2014 | |
| WO | 2015/197222 A1 | 12/2015 | |

*Primary Examiner* — Peter M Bythrow
(74) *Attorney, Agent, or Firm* — Norton Rose Fulbright US LLP; Gerard Messina (57) ABSTRACT

A method for determining distances and relative velocities of objects with using a radar includes transmitting a ramp-like frequency-modulated transmission signal whose modulation pattern includes multiple sequences of ramps having an identical ramp slope, which alternately follow each other, the sequences having a frequency offset and a time offset with respect to each other; Undersampling, and subjecting to a 2D Fourier transform, base band signals for the individual ramps; determining hypotheses for the distance and the relative velocity v of an object based on alternative distance-velocity relationships and based on periodic ambiguous information about velocity; ascertaining degrees of the agreements of a phase relationship between spectral values of the spectra with phase relationships expected for the hypotheses between spectral values of the sequences; and determining unambiguous estimated values for the distance and the relative velocity by selecting a hypothesis having the maximum agreement.

8 Claims, 3 Drawing Sheets

(56) References Cited

U.S. PATENT DOCUMENTS

| | | | | |
|---|---|---|---|---|
| 5,325,097 | A * | 6/1994 | Zhang | G01S 13/34 342/130 |
| 5,345,470 | A * | 9/1994 | Alexander | G01S 7/023 375/144 |
| 5,963,163 | A * | 10/1999 | Kemkemian | G01S 13/34 342/109 |
| 6,633,815 | B1 * | 10/2003 | Winter | G01S 13/956 701/301 |
| 6,646,587 | B2 * | 11/2003 | Funai | G01S 13/26 342/26 R |
| 7,508,337 | B2 * | 3/2009 | Morinaga | G01S 7/352 342/109 |
| 7,724,181 | B2 * | 5/2010 | Natsume | G01S 13/426 342/103 |
| 7,786,927 | B2 * | 8/2010 | Kondoh | G01S 7/35 342/109 |
| 7,791,530 | B2 * | 9/2010 | Puglia | G01S 7/352 342/128 |
| 8,077,076 | B2 * | 12/2011 | Walter | G01S 13/345 342/118 |
| 8,390,506 | B2 * | 3/2013 | Focke | G01S 13/345 342/112 |
| 8,872,674 | B1 * | 10/2014 | Subramanya | G01S 7/2926 340/933 |
| 9,354,304 | B2 * | 5/2016 | Kirsch | G01S 13/58 |
| 9,853,365 | B2 * | 12/2017 | Kumar | H01Q 23/00 |
| 2003/0052813 | A1 * | 3/2003 | Natsume | G01S 7/354 342/70 |
| 2004/0130482 | A1 * | 7/2004 | Lin | G01S 7/023 342/82 |
| 2005/0225481 | A1 * | 10/2005 | Bonthron | G01S 7/032 342/175 |
| 2007/0152871 | A1 * | 7/2007 | Puglia | G01S 7/352 342/70 |
| 2008/0100500 | A1 * | 5/2008 | Kondoh | G01S 7/35 342/109 |
| 2008/0122680 | A1 * | 5/2008 | Morinaga | G01S 7/352 342/109 |
| 2009/0140912 | A1 * | 6/2009 | Kato | G01S 7/35 342/70 |
| 2009/0309782 | A1 * | 12/2009 | Takabayashi | G01S 13/343 342/105 |
| 2010/0277361 | A1 * | 11/2010 | Focke | G01S 13/345 342/133 |
| 2010/0289692 | A1 * | 11/2010 | Winkler | G01S 7/4008 342/70 |
| 2011/0122014 | A1 * | 5/2011 | Szajnowski | G01S 7/023 342/109 |
| 2013/0069818 | A1 * | 3/2013 | Shirakawa | G01S 13/347 342/146 |
| 2014/0022111 | A1 * | 1/2014 | Kuehnle | G01S 13/584 342/109 |
| 2014/0253365 | A1 * | 9/2014 | Kirsch | G01S 13/58 342/112 |
| 2014/0347211 | A1 * | 11/2014 | Schoor | G01S 7/35 342/147 |
| 2015/0002332 | A1 * | 1/2015 | Bi | G01S 7/35 342/200 |
| 2015/0301172 | A1 * | 10/2015 | Ossowska | G01S 7/023 342/70 |
| 2016/0131742 | A1 * | 5/2016 | Schoor | H01Q 1/3233 342/128 |
| 2016/0187462 | A1 * | 6/2016 | Altus | G01S 7/35 342/175 |
| 2017/0131396 | A1 * | 5/2017 | Schoor | G01S 7/354 |
| 2018/0045819 | A1 * | 2/2018 | Cornic | G01S 13/28 |

* cited by examiner

CHIRP SEQUENCE RADAR UNDERSAMPLED MULTIPLE TIMES

CROSS-REFERENCE TO RELATED APPLICATIONS

The present application claims priority under 35 U.S.C. § 119 to DE 10 2017 200 706.0, filed in the Federal Republic of Germany on Jan. 18, 2017, the content of which is hereby incorporated by reference herein in its entirety.

FIELD OF THE INVENTION

The present invention relates to a method for determining distances and relative velocities of objects with the aid of a radar, in which a ramp-like frequency-modulated transmission signal is transmitted, whose modulation pattern includes a first sequence of first ramps having an identical ramp slope and a second sequence of second ramps having an identical ramp slope, the first and second ramps following one another alternately, the sequences having a frequency offset and a time offset with respect to each other, the transmission signal being mixed with a received signal to form a base band signal, and the base band signals of the ramps being transformed into spectra, two-dimensional spectra being calculated by a transformation in a first dimension for the ramps and in a second dimension for the sequences.

The present invention furthermore relates to a radar sensor, in particular for motor vehicles, which is designed to carry out this method.

BACKGROUND

Radar sensors are utilized, for example, in motor vehicles in conjunction with driver assistance systems, such as adaptive cruise control systems or collision warning systems, and are used to detect the traffic surroundings of the vehicle. In particular, such radar sensors are used to measure the distances and relative velocities of preceding vehicles.

WO 2015/197222 A1 describes a radar sensor, in which a modulation pattern of a transmission signal includes chronologically interleaved sequences of frequency ramps having the same slope and the same deviation. A two-dimensional spectrum is calculated separately for each of the sequences from the obtained base band signals. From a position of a peak in the spectrum, values for the relative velocity of a radar target are determined, which are periodic with a predetermined velocity period. A phase relationship between spectral values, which were obtained at the same respective position in the separately calculated two-dimensional spectra, is checked for agreement with expected phase relationships, which are expected for multiple periodic values of the relative velocity. Based on the check for agreement, an estimated value for the relative velocity of the radar target is selected from the periodic values.

WO 2014/075838 A1 describes a rapid chirps FMCW radar, in which a modulation pattern includes at least two ramps, which differ only by a fixed frequency offset and follow each other in a certain time interval, and in which, based on a phase difference of the intermediate frequency signals for these two ramps, an unambiguous approximate value for the object distance is calculated.

SUMMARY

Embodiments of the present invention provide a novel method for determining distances and relative velocities of objects using a radar, which allows the distances and relative velocities to be measured unambiguously and with high accuracy.

Base band signals of the individual ramps are undersampled and then subjected to the transformation. Hypotheses for the distance and the relative velocity of an object are determined based on alternative relationships between the distance and the relative velocity, of which one relationship corresponds to the first dimension of a first position of a spectral value of the spectra, and at least one further relationship corresponds to the first dimension of a position corresponding to the first position according to the undersampling above half the sampling frequency of the undersampling, and based on periodic ambiguous information about the relative velocity according to the second dimension of a position of a spectral value of the spectra. Degrees of the agreements of a phase relationship between spectral values of the spectra with respective phase relationships expected for the hypotheses between spectral values of the sequences are ascertained. Unambiguous estimated values for the distance and the relative velocity of the object are determined by selecting a hypothesis having the maximum agreement.

In this way, degrees of the agreements of a phase relationship between spectral values of the individual spectra, on the one hand, with respective phase relationships expected for the hypotheses between spectral values of the individual sequences, on the other hand, are ascertained. In particular, degrees of the agreements with expected phase relationships, which are expected for the hypotheses, are ascertained for a phase relationship between spectral values, which were obtained at the same respective position in the two-dimensional spectra separately calculated for the sequences. Based on the ascertained degrees of the agreements, one of the hypotheses is selected.

The individual ramps are also referred to as frequency chirps. By undersampling the base band signals for the individual ramps, an aliasing effect is allowed, which makes it possible to detect base band signals whose frequency is outside the frequency range of the spectra. In particular, more remote objects can be detected in the obtained spectra by frequency shift and/or frequency mirroring in the spectra, even though their base band signal is outside the frequency range of the spectra, based on the sampling of the individual ramps. In this way, it is made possible to detect an object in the spectra whose base band signal, based on the sampling of the individual ramps, is located above the frequency range of the individual spectra based on the distance of the object. In this way, the maximum range can be increased in which a radar sensor is still able to detect objects. As an alternative or in addition, the requirements with regard to the memory and computing power of an evaluation unit may be reduced since the sampling frequency may be decreased by allowing the undersampling.

The phase of the base band signal responds relatively sensitively to the small change in the object distance d which results from the relative movement of the object during the short time interval from one frequency ramp to the next. Since the phase change is a periodic function of the relative velocity v, the relative velocity can only be unambiguously determined directly by a transformation from a sequence of ramps if it is so small that the phase change is less than half a period (i.e., less than PI). Since, according to the present invention, periodic ambiguous information about the relative velocity is used to determine hypotheses for the distance and relative velocity of an object, it suffices if it is possible to determine the periodic ambiguous information about the relative velocity from the position of the particular spectral value of the two-dimensional spectra. The time interval between the ramps of a sequence and the duration of a ramp can thus be selected to be relatively large, so that requirements with regard to the computing power and the memory can be further reduced. The periodic ambiguous information about the relative velocity can be periodic ambiguous relationships between d and v with respect to the relative velocity, which differ from the alternative relationships mentioned first. When the frequency difference of consecutive ramps of a sequence is equal to zero, the peak position (position of the spectral value) in the second dimension only contains information about the relative velocity of the object. The periodic ambiguous information about the relative velocity is then a periodic ambiguous value of the relative velocity.

In this way, both an undersampling of the phase change of the base band signal via the sequence of the ramps is allowed, and an undersampling of the base band signal of the individual ramps is carried out. In this way, not only periodic ambiguous information about the relative velocity is obtained, but multiple alternative relationships between d and v are obtained from the individual ramps, which can correspond to straight lines in the d-v diagram, for example.

Sampling frequency $f_s$ of the undersampling of the individual ramps is selected to be so low that an upper maximum value $d_{max}$ of the measuring range for distance d to be determined exceeds the distance range unambiguously resolvable by sampling the respective ramp using sampling frequency $f_s$. In particular, $f_s$ is selected to be so low that the upper maximum value $d_{max}$ of the measuring range for the distance to be determined has the following relationship to sampling frequency $f_s$: $d_{max} > cf_s/(4F/T)$, where c is the velocity of light, and F/T is the ramp slope, i.e., the frequency change per time.

Consecutive ramps of the same sequence are chronologically offset by a time interval $T_{r2r}$, based on the ramp centers, which is selected to be so large that an upper maximum value of the absolute value $v_{max}$ of the measuring range for the relative velocity to be determined exceeds the velocity range unambiguously resolvable by the sequence of the ramps. In particular, $T_{r2r}$ is selected to be so large that the above-mentioned upper maximum value $v_{max}$ of the measuring range for the relative velocity to be determined has the following relationship to time interval $T_{r2r}$ of the ramp centers within a sequence: $T_{r2r} > c/(4f_0 v_{max})$, where $f_0$ is a mean transmission frequency.

To be able to resolve the resulting multiple ambiguities in relative velocity and distance, hypotheses for the distance and the relative velocity of an object are determined, degrees of the agreements of phase relationships expected for the hypotheses between the spectral values for the sequences with phase relationships of the actually obtained, i.e., measured, spectra are ascertained, and a hypothesis having maximum agreement is selected. Their values of the distance and of the relative velocity are then determined as unambiguous estimated values for the distance and the relative velocity of an object.

For the individual alternative relationships between the distance and the relative velocity, it is possible, in the determination of the hypotheses, for example by linking a respective relationship with the periodic ambiguous information about the relative velocity, to determine multiple discrete hypotheses for the distance and the relative velocity which satisfy the particular relationship. In this way, the possible hypotheses can be efficiently ascertained.

In an example embodiment of the method, the ramp center frequencies within a respective sequence change by the same frequency difference from ramp to ramp, the sequences having the same frequency difference from ramp to ramp within the respective sequence. The change in the ramp center frequency increases the bandwidth of the signals available for determining distances from objects. This allows a better separation of the base band signals of stationary objects, which due to an exactly identical relative velocity are only separated based on the respective distances.

In an example embodiment of the method, the modulation pattern furthermore includes at least one further sequence of further ramps having the same ramp slope, the first, second and further ramps of the at least one further sequence alternately following each other, the first sequence and the at least one further sequence having a time offset with respect to each other, based on the ramp centers. Preferably, the first and second sequences and the at least one further sequence have a frequency offset from each other in pairs, based on the ramp centers, which differs from the frequency offsets between the respective other pairs of the sequences. For example, the modulation pattern can include a third sequence of third ramps having an identical ramp slope, the first, second and third ramps alternately following each other, and the first sequence and the third sequence having a frequency offset with respect to each other, based on the ramp centers, which differs from the frequency offset between the first sequence and the second sequence, and from a frequency offset between the second sequence and the third sequence, and the first sequence and the third sequence having a time offset with respect to each other, based on the ramp centers. As a result of respective different frequency offsets, the information content of the obtained base band signals is improved.

Example embodiments of the present invention are directed to a radar sensor including a control and evaluation unit in which the above-described method is implemented.

Exemplary embodiments are described in greater detail hereafter based on the drawings.

DETAILED DESCRIPTION

Figure 1:
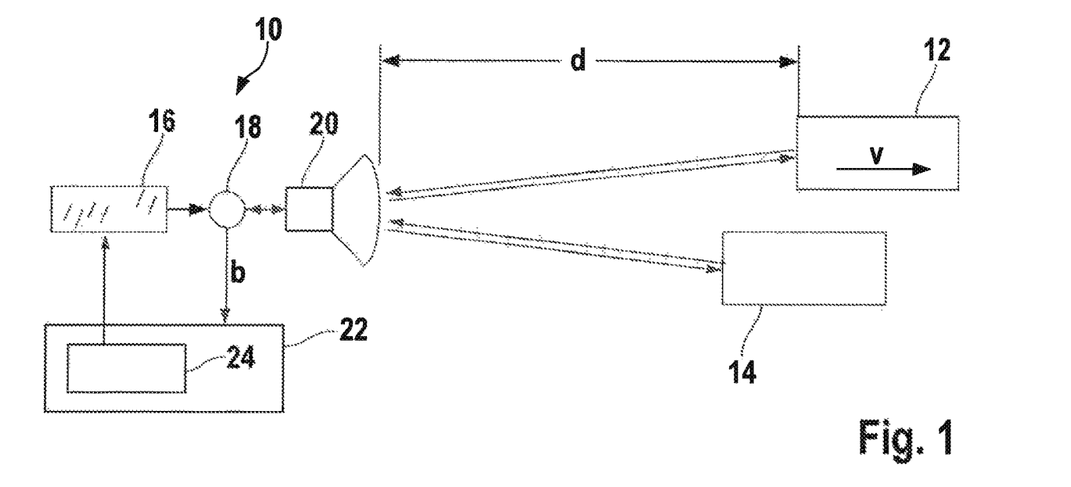
FIG. 1 shows a block diagram of a FMCW radar sensor according to an example embodiment of the present invention.

FIG. 1 shows a simplified block diagram of a FMCW radar sensor 10, which is installed in the front of a motor vehicle, for example, and used to measure distances d and relative velocities v of objects 12, 14, for example of preceding vehicles. Radar sensor 10 includes a voltage-controlled oscillator 16, which supplies a frequency-modulated transmission signal via a mixer 18 to a transceiver 20, which emits the signal in the direction of objects 12, 14. The signal reflected on the objects is received by transceiver 20 and mixed in mixer 18 with a portion of the transmission signal. In this way, a base band signal b is obtained, which is further evaluated in an electronic evaluation and control unit 22.

Control and evaluation unit 22 includes a control block 24 which controls the function of oscillator 16. The frequency of the transmission signal supplied by oscillator 16 is periodically modulated in the form of multiple sequences of rising and/or falling frequency ramps, the sequences being chronologically interleaved with each other.

Figure 2:
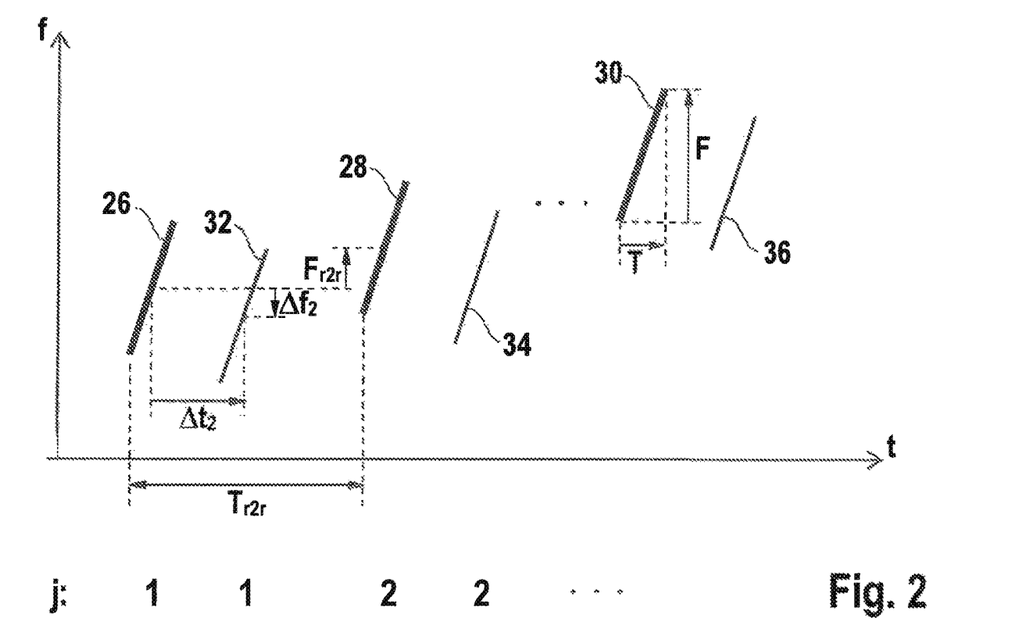
FIG. 2 shows a modulation pattern of a transmission signal having two sequences of time-offset ramps, having a frequency offset between the sequences, according to an example embodiment of the present invention.

In the schematic illustration of FIG. 2, ramps 26, 28, 30 of a first sequence shown in bold and ramps 32, 34, 36 of a second sequence shown with thin lines alternately follow one another. In particular, the sequences chronologically largely overlap one another. The consecutive ramps of the respective sequence are counted using a continuous index j. The frequency ramps of the two sequences each have the same frequency deviation F, the same duration T, and the same ramp slope F/T. In this way, the phase relationships resulting from the relative velocity of a radar target may be measured particularly accurately. Consecutive ramps of the same sequence differ from each other from ramp to ramp by a frequency difference $F_{r2r}$ and are chronologically offset by a time interval $T_{r2r}$, based on the ramp centers. The sequences have an agreeing frequency difference $F_{r2r}$ within the respective sequence. The time interval $T_{r2r}$ for the sequences is also the same in each case.

Based on a fixed reference point in time $t_0=0$, the first ramp of the first sequence has a time offset $\Delta t_1$. The first ramp of the second sequence has a time offset $\Delta t_2-\Delta t_1$ compared to the first ramp of the first sequence. Based on a fixed reference frequency, the first ramp of the first sequence has a frequency offset $\Delta f_1$. The first ramp of the second sequence has a frequency offset $\Delta f_2-\Delta f_1$ compared to the first ramp of the first sequence. Here and hereafter, the time offset and the frequency offset are always based on the ramp centers.

Preferably, the absolute value of time offset $\Delta t_2-\Delta t_1$ between two respective sequences is dissimilar from half the time interval $T_{r2r}$ between the ramp centers of consecutive ramps of a respective sequence. This can help increase the information content of the measurements.

Preferably, the absolute value of time offset $\Delta t_2-\Delta t_1$ between the sequences is smaller than twice the time interval $T_{r2r}$ between the ramp centers of consecutive ramps of a respective sequence. Due to the close interleaving of the sequences, influences of an object acceleration on the phase relationship between the base band signals of the individual sequences can be kept preferably small. Particularly preferably, a respective ramp of the respective second or further sequence of ramps is always transmitted between two consecutive ramps of the first sequence.

A modulation block having the length $T_{r2r}$ of the modulation pattern includes a single ramp from each sequence. The modulation pattern corresponds to a sequence of repeated modulation blocks, the ramp center frequencies of the respective ramps changing from block to block by the same frequency difference $F_{r2r}$.

Within a modulation block, the ramps are preferably situated at irregular time intervals, so that the modulation pattern preferably has little symmetry, despite the regular time interval $T_{r2r}$. Accordingly, the modulation pattern includes pauses between individual ramps. In particular, each modulation block having length $T_{r2r}$ includes at least one pause. Moreover, favorable values for the time offset between the sequences and the time interval of the ramps within a sequence can thus be selected, which preferably are "incommensurable," i.e., not multiples of each other. Due to the uniform time interval $T_{r2r}$, the time offsets between the ramps of different sequences repeat themselves from modulation block to modulation block.

Figure 3:
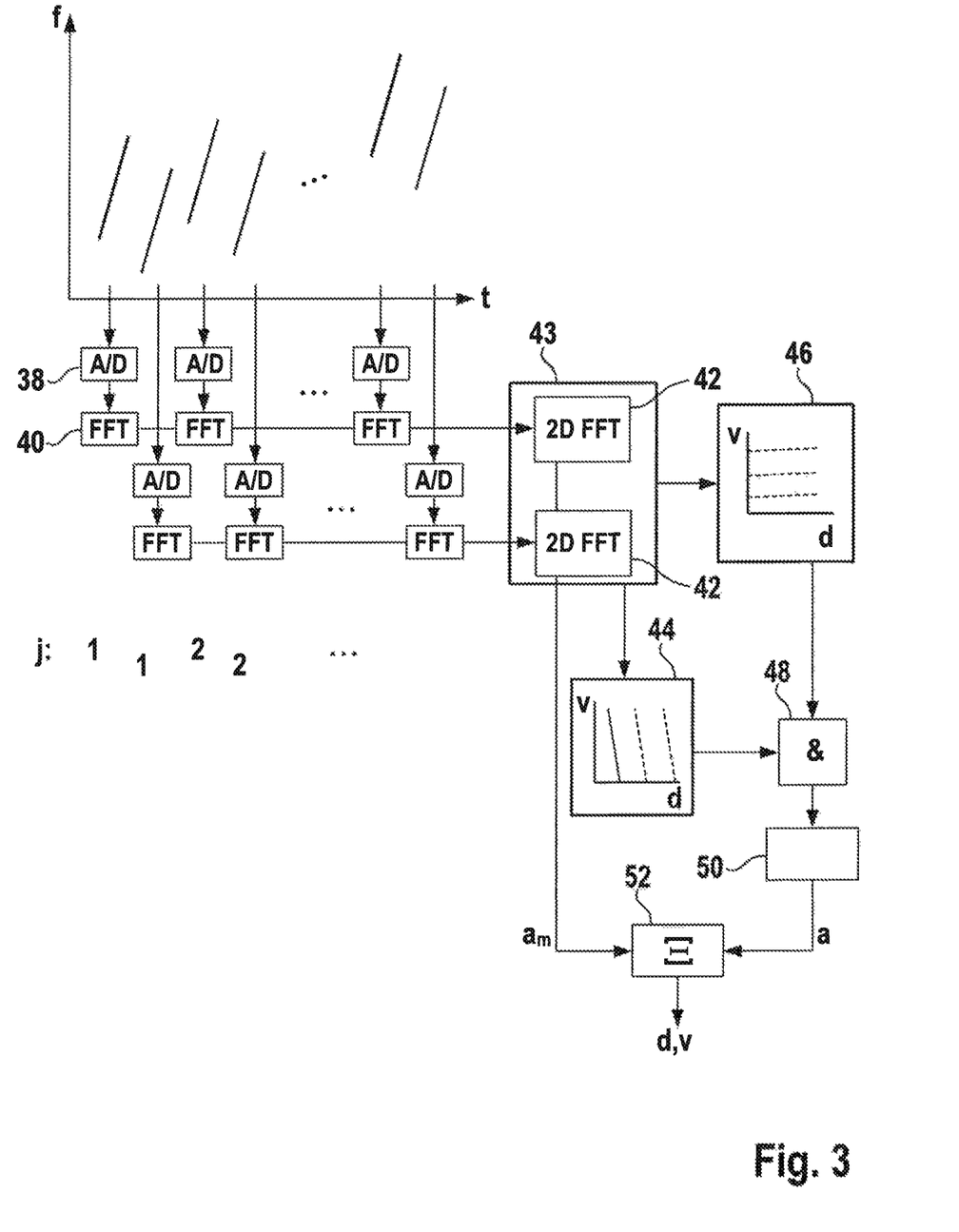
FIG. 3 shows a more detailed block diagram of a radar sensor, according to an example embodiment of the present invention.

As shown in FIG. 3, the base band signals b received for the individual ramps of the sequences are each subject to an A/D conversion in an A/D converter block 38. For this purpose, the base band signal (real amplitude as a function of the time) is sampled at multiple points in time distributed uniformly over the duration of the ramp. During this A/D conversion, an undersampling, which is described below, takes place by appropriately selecting sampling frequency $f_s$. The sampling points in time are counted using an index k.

In a first transformation block 40, the base band signal b of each individual undersampled ramp (using index j) is subjected to a one-dimensional discrete Fourier transform (FFT), which supplies a one-dimensional spectrum for this ramp, i.e., a complex amplitude $s_j$, as a function of a frequency variable $f_k$ (corresponding to a bin k). Overall, in this way a number of different spectra are obtained for each sequence. If a certain frequency value $f_k$ is now defined, the associated amplitudes $s_j(f_k)$ can be interpreted as a function of ramp index j, which then serves as a discrete time variable, and it is possible to again carry out a discrete Fourier transform (FFT) for every $f_k$ according to ramp index j for these functions in a second transformation block 42. The result is a function which indicates the amplitude (for a fixed $f_k$) as a function of a further frequency variable $f_j$ (corresponding to a bin j). In summary, it is possible to represent the complex amplitudes in a two-dimensional frequency domain as a function of the frequency variables $f_k$ and $f_j$ (or bins k, j), which is why the entire process is referred to as a two-dimensional Fourier transform (2D FFT). The first dimension corresponds to a transformation of the base band signals obtained for the individual ramps. The second dimension corresponds to a transformation via the sequence of the ramps, i.e., via ramp index j. The transformations in the two dimensions can be carried out consecutively, as shown, or jointly. For each of the sequences, a two-dimensional spectrum is calculated. Detected objects correspond to peaks in the respective spectrum.

For the further evaluation of the two-dimensional spectra, hypotheses are now determined for relative velocity v and distance d of a detected object. For example, a position of a spectral value of the spectra is determined based on a performance peak of at least one of the two-dimensional spectra, and in particular based on a peak in a performance spectrum which is calculated from at least one or from the two-dimensional spectra, e.g., by summation of squares of absolute values. For this purpose, for example, a two-dimensional performance spectrum can be resorted to in that a performance spectrum is calculated with the aid of a combination block 43 from the complex two-dimensional spectra of the sequences by respectively forming the square of absolute value of the respective spectral value, and in that the performance spectra of the sequences are combined by point by point summation or averaging.

A detected object 12 causes a peak (local or relative maximum value) in the performance spectrum. The spectral position of the peak is evaluated. In a first evaluation block 44, a linear relationship between relative velocity v and distance d of a radar object is obtained from the first dimension, corresponding to bin k of the position of the peak, according to the FMCW equation $k=2/c(dF+f_0vT)$.

Here, c is the velocity of light, F the ramp deviation, T the ramp duration of an individual ramp, and $f_0$ the average transmission frequency.

Due to the undersampling using sampling frequency $f_s$ (sampling using a sub-Nyquist sampling rate), however, a peak at a base band signal frequency $f_{observed}$ can correspond not only to an object at distance d and relative velocity v. Rather, this can also be a mirrored or shifted signal having a higher frequency, corresponding to a larger distance d.

Due to the undersampling, signals having frequencies between $f_s/2$ and $f_s$ are mirrored, so that $f_{observed}=f_s-f_{true}$ applies. At the same time, the obtained phases of the complex amplitudes are inverted in the two-dimensional spectrum, i.e., the amplitudes are conjugate-complex to the true amplitudes of the signal. A first frequency range of the base band signals below $f_s/2$ is thus superimposed in the spectrum with a mirroring of a second frequency range above $f_s/2$ and below $f_s$. A mirroring accordingly takes place for signals having frequencies between $3f_s/2$ and $2f_s$.

Signals having frequencies between $f_s$ and $3f_s/2$, or between $2f_s$ and $5f_s/2$, are shifted by $f_s$ or $2f_s$ as a result of the undersampling and directly superimposed with signals having frequencies between 0 and $f_s/2$.

Depending on the design or presence of an anti-aliasing filter of the A/D converter, higher frequency ranges can also be allowed, which are correspondingly mirrored or shifted, or fewer frequency ranges, however at least one such frequency range above $f_s/2$.

Corresponding to the multiple ambiguities in the first dimension of the spectra allowed due to the undersampling, at least one further, alternative relationship between v and d is thus determined in evaluation block 44 for the ascertained relationship between v and d. The further, alternative relationship includes larger distances for an identical range of v than the first relationship; however, these are within a desired measuring range for the distance of maximally $d_{max}$ to be ascertained. The alternative relationship, for example, corresponds to a spectral value, corresponding to the spectral value in bin k of the position of the peak, in hypothetical bin $2k_{max}-k$ outside the spectrum, $k_{max}$ being the number of the frequencies or bins of the spectrum in the first dimension.

According to the FMCW equation, periodic ambiguous information about relative velocity v is determined in a second evaluation block 46 for the sequence of the ramp center frequencies of the respective sequence from the position of the peak in the second dimension of the spectra, corresponding to a bin j of the position of the peak. Due to a relatively large time interval $T_{r2r}$, the information about the relative velocity of the object within the desired measuring range for the velocity to be ascertained, obtained from the sampling of the Doppler frequency, is ambiguous up to an absolute value of maximally $v_{max}$ since at higher relative velocities v the resulting Doppler frequency is undersampled by the relatively large time intervals $T_{r2r}$. An undersampling of the Doppler frequency thus takes place via the sequence of the ramps. The obtained information about relative velocity v, for a respective d, is periodic with a velocity interval $$\Delta v = \frac{c}{2f_0 T_{r2r}}$$

where c is the speed of light, and $f_0$ the average transmission frequency. The information corresponds, for example, to a linear relationship between d and v, and its repetitions at the interval $\Delta v$, however the relationship differing from the above-mentioned alternative relationships by a different slope of the d-v straight line.

The alternative relationships between relative velocity v and distance d are now each linked in a linking block 48 with the periodic ambiguous information about relative velocity v, a number of (d,v) pairs resulting as hypotheses for d and v for each of the alternative relationships. During the generation of the hypotheses, thus first, ambiguous information from the obtained spectral values of the spectra and hypothetical spectral values corresponding thereto according to the undersampling at frequencies above half the sampling frequency is linked with second, ambiguous information from the phase differences between the obtained spectral values of the spectra for the ramps of a sequence. The first information stems from the first dimension of the transformation, and the second information stems from the second dimension of the transformation.

To resolve the multiple ambiguities of the generated hypotheses for (d,v), degrees of agreement of phase relationships, expected for the hypotheses, between spectral values for the sequences with phase relationships of the obtained spectra are ascertained. Then, unambiguous estimated values for the distance and the relative velocity of an object are determined by selecting a hypothesis having the maximum degree of agreement.

For this purpose, the control vector a(d,v) of the measurement is calculated for each hypothesis for distance d and relative velocity v in a calculation block 50. This can be calculated as:

$$a(d,v) = \frac{1}{\sqrt{I}} \begin{bmatrix} e^{2\pi j \frac{2}{c}(f_0+\Delta f_1)(d+v\Delta t_1)} \\ M \\ e^{2\pi j \frac{2}{c}(f_0+\Delta f_i)(d+v\Delta t_i)} \end{bmatrix} = \frac{1}{\sqrt{I}} \begin{bmatrix} e^{2\pi j \frac{2}{c}(d\Delta f_1+f_0 v\Delta t_1+v\Delta f_1\Delta t_1)} \\ M \\ e^{2\pi j \frac{2}{c}(d\Delta f_i+f_0 v\Delta t_i+v\Delta f_i\Delta t_i)} \end{bmatrix} \cdot e^{2\pi j \frac{2}{c}d f_0}$$

where d is the distance, v is the relative velocity of the hypothesis, and I is the number of sequences in the components of the vector for the respective sequence i=1, ..., I, where $\Delta t_i$ is the time offset and $\Delta f_i$ is the frequency offset, based on the average transmission frequency $f_0$ and fixed point in time $t_0$. The shared prefactor is a standardization factor and is 1, divided by the square root from the number I of sequences used. In the exponent of the exponential function, j denotes the imaginary unit, unless indicated otherwise. The control vector determines the phase relationships between the complex amplitudes of the signals received for the I sequences. In this way, the expected phase relationships are determined. The reference values $f_0$ and $t_0$ can be selected in such a way that $\Delta t_1$ and $\Delta f_1$ are equal to zero; in the phase of the complex exponential function, the components of the vector then directly indicate the expected phase relationship between the particular sequence and the first sequence. The expected phase relationships depend on distance d due to frequency offset $\Delta f_i - \Delta f_1$, which is not equal to zero.

A measuring vector $a_m$ is defined, for example for a reception channel n, as $$a_m(n) = \begin{bmatrix} x_1(n) \\ \vdots \\ x_i(n) \end{bmatrix}$$

where n counts the reception channels, and in the ith component of vector $x_i(n)$ denotes a complex spectral value of the two-dimensional spectrum of the sampled base band signals of the ith sequence of ramps of reception channel n.

For every hypothesis (d,v), now a potential inversion of the phase due to the undersampling is considered. This can take place in each case in measuring vector $a_m(n)$ or in control vector $a(d,v)$ by reversing the sign of the particular phase, i.e., the component of the vector is replaced by its complex conjugate.

From the measuring vector and control vector corrected taking the potential phase inversion into consideration, in an assessment block 52 for the particular hypotheses a distance-relative velocity≡(d,v) spectrum is then evaluated, which is defined as $$\Xi(d, v) = \frac{1}{\sum_{n=1}^{N} |a_m^H(n)|^2} \sum_{n=1}^{N} |a_m^H(n) a(d, v)|^2$$

where $a_m^H$ denotes the Hermitian conjugate vector for the measuring vector, i.e., a row vector in which the individual components are complex conjugates of the components of vector $a_m$. The vector product is executed in each case via the length of control vector a, corresponding to number I of the sequences. The sum is executed via reception channels N.

A hypothesis which assumes a maximum value for ≡(d,v) is then selected as an unambiguous estimation for d and v. In this way, in particular, the estimated value for relative velocity v in a measuring range for the relative velocity is unambiguously determined, an upper maximum value $v_{max}$ of the measuring range having the following relationship to time interval $T_{r2r}$ of the ramp centers within a sequence:

$$T_{r2r} > c/(4f_0 v_{max})$$

where c is the velocity of light, and $f_0$ the average transmission frequency. Preferably, $T_{r2r}$ is at least a multiple of the aforementioned variable on the right side of the relationship.

The described method can be expanded for carrying out a radar measurement using multiple transmission channels of a radar sensor. For this purpose, a respective control vector is defined for each transmitter of multiple transmitters transmitting with time-offset from each other.

For multiple transmitters, the sum in ≡(d,v) is accordingly executed via transmission channels n, i.e., the product of the number of transmitters and receivers, $a(d,v)$ being defined for the respective transmitter, and $a_m(n)$ being the measuring vector of transmission channel n.

Figure 4:
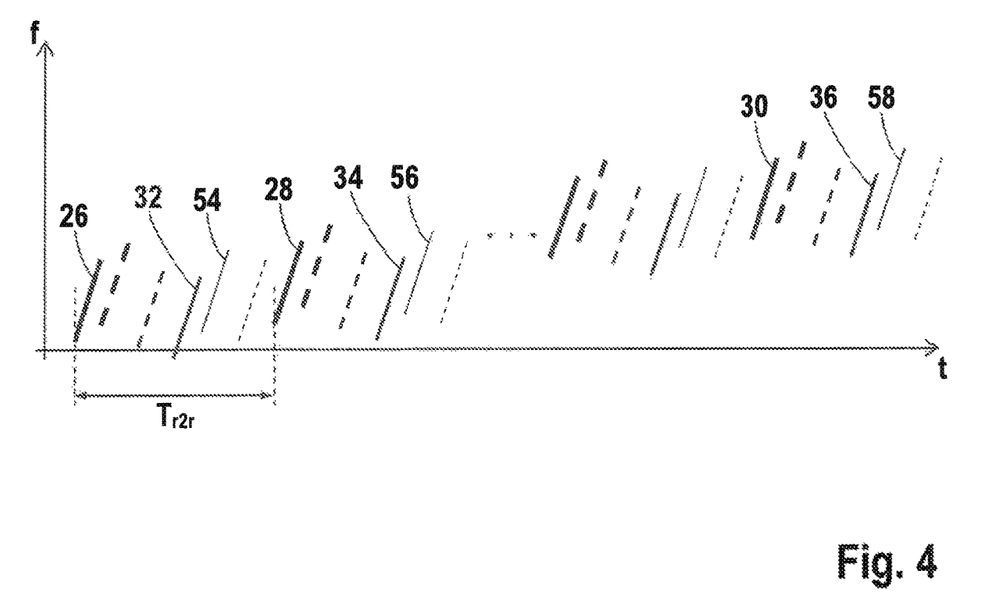
FIG. 4 shows a modulation pattern of a transmission signal including three respective sequences of time-offset ramps, according to an example embodiment of the present invention.

FIG. 4 schematically represents a modulation pattern for two transmitters, each having three sequences of ramps. Ramps of the first transmitter are represented by solid lines, ramps of the second transmitter with dotted lines. Different line thicknesses represent the different sequences. The ramps of the respective sequences alternately follow each other.

What is claimed is:

1. A method for determining distances and relative velocities using a radar, the method comprising:
    transmitting, by the radar, ramp-like frequency-modulated transmission signals that include a modulation pattern that includes a first sequence of first ramps, which are of a first identical ramp slope, and a second sequence of second ramps, which are of a second identical ramp slope, wherein the first and second ramps are interleaved for respective ones of each one of the first and second sequences to follow respective ones of the other of the first and second sequences each other so that the first and second sequences alternate and wherein the sequences have a frequency offset and a time offset with respect to each other;
    receiving, by the radar, signals;
    mixing the received signals with at least portions of the transmitted signals to form base band signals;
    undersampling the base band signals for individual ones of the ramps of the first and second sequences;
    transforming the undersampled base band signals of the ramps into spectra, wherein the transforming includes calculating two-dimensional spectra by a transformation in a first dimension for the ramps and in a second dimension for the sequences;
    determining hypotheses for a distance and a relative velocity of an object based on:
        alternative relationships between the distance and the relative velocity, of which one relationship corresponds to the first dimension of a first position of a spectral value of the spectra, and another relationship corresponds to the first dimension of a position corresponding to the first position according to the undersampling above half a sampling frequency of the undersampling; and
        periodic ambiguous information about the relative velocity according to the second dimension of a position of a spectral value of the spectra;
    ascertaining degrees of the agreements of a phase relationship between spectral values of the spectra with respective phase relationships expected for the hypotheses between spectral values of the sequences; and
    determining unambiguous estimated values for the distance and the relative velocity of the object by selecting a hypothesis having the maximum agreement.

2. The method of claim 1, wherein, during the undersampling of the base band signals, an aliasing effect is allowed, which makes it possible to detect base band signals whose frequency is outside the frequency range of the spectra, based on the individual ramps.

3. The method of claim 1, wherein, for respective ones of the alternative relationships between the distance and the relative velocity, multiple discrete hypotheses for the distance and the relative velocity are determined, which satisfy the respective relationship, by linking the respective relationship with the periodic ambiguous information about the relative velocity.

4. The method of claim 1, wherein ramp center frequencies within a respective sequence change by a same frequency difference from ramp to ramp, the sequences having the same frequency difference from ramp to ramp within the respective sequence.

5. The method of claim 1, wherein, during the determination of the hypotheses for the distance and the relative velocity of an object, a position of the spectral value of the spectra is determined based on a performance peak of at least one of the two-dimensional spectra.

6. The method of claim 1, wherein the modulation pattern includes at least one further sequence of further ramps having the same ramp slope, the first, second and further ramps of the at least one further sequence alternately following one another, the first sequence and the at least one further sequence having a time offset with respect to one another, based on the ramp centers.

7. The method of claim 6, wherein the first and second sequences and the at least one further sequence have a frequency offset among one another in pairs, based on the ramp centers, which differs from the frequency offsets between the respective other pairs of the sequences.

8. A radar sensor comprising:
a transmitter configured to transmit ramp-like frequency-modulated transmission signals that include a modulation pattern that includes a first sequence of first ramps, which are of a first identical ramp slope, and a second sequence of second ramps, which are of a second identical ramp slope, wherein the first and second ramps are interleaved for respective ones of each one of the first and second sequences to follow respective ones of the other of the first and second sequences each other so that the first and second sequences alternate and wherein the sequences have a frequency offset and a time offset with respect to each other;
a receiver configured to receive signals; and
processing circuitry, wherein the processing circuitry is configured to:
  mix the received signals with at least portions of the transmitted signals to form base band signals;
  undersample the base band signals for individual ones of the ramps of the first and second sequences;
  transform the undersampled base band signals of the ramps into spectra, wherein the transforming includes calculating two-dimensional spectra by a transformation in a first dimension for the ramps and in a second dimension for the sequences;
  determine hypotheses for a distance and a relative velocity of an object based on:
    alternative relationships between the distance and the relative velocity, of which one relationship corresponds to the first dimension of a first position of a spectral value of the spectra, and another relationship corresponds to the first dimension of a position corresponding to the first position according to the undersampling above half a sampling frequency of the undersampling; and
    periodic ambiguous information about the relative velocity according to the second dimension of a position of a spectral value of the spectra;
  ascertain degrees of the agreements of a phase relationship between spectral values of the spectra with respective phase relationships expected for the hypotheses between spectral values of the sequences; and
  determine unambiguous estimated values for the distance and the relative velocity of the object by selecting a hypothesis having the maximum agreement.

* * * * *